US 9,272,668 B2

(12) United States Patent
Suzuki et al.

(10) Patent No.: US 9,272,668 B2
(45) Date of Patent: Mar. 1, 2016

(54) OVERHEAD CONSOLE AND A COUPLING METHOD THEREOF

(71) Applicant: KOJIMA INDUSTRIES CORPORATION, Toyota-shi (JP)

(72) Inventors: Kenta Suzuki, Toyota (JP); Tomohiro Miura, Toyota (JP)

(73) Assignee: KOJIMA INDUSTRIES CORPORATION, Toyota-Shi (JP)

( * ) Notice: Subject to any disclaimer, the term of this patent is extended or adjusted under 35 U.S.C. 154(b) by 0 days.

(21) Appl. No.: 14/527,849

(22) Filed: Oct. 30, 2014

(65) Prior Publication Data

US 2015/0115642 A1    Apr. 30, 2015

(30) Foreign Application Priority Data

Oct. 31, 2013   (JP) ................................. 2013-226190

(51) Int. Cl.
*B60R 7/04*     (2006.01)

(52) U.S. Cl.
CPC ....................................... *B60R 7/04* (2013.01)

(58) Field of Classification Search
CPC ........................................................ B60R 7/04
USPC .................................. 296/37.8, 37.7; 49/506
See application file for complete search history.

(56) References Cited

U.S. PATENT DOCUMENTS

| 5,620,122 | A  | * | 4/1997  | Tanaka ................... B60N 3/102 220/264 |
| 5,775,761 | A  | * | 7/1998  | Asami ....................... B60R 7/04 224/282 |
| 6,003,925 | A  | * | 12/1999 | Litke et al. .................... 296/37.8 |
| 6,062,623 | A  | * | 5/2000  | Lemmen ...................... 296/37.8 |
| 6,510,973 | B1 | * | 1/2003  | Ichioka ................... B60R 7/087 206/0.83 |
| 6,588,624 | B1 | * | 7/2003  | Connors et al. ............... 220/827 |
| 7,025,225 | B2 | * | 4/2006  | Inari ......................... B60R 7/06 16/285 |
| 7,566,084 | B2 | * | 7/2009  | Kikuchi ....................... 296/37.8 |
| 7,661,741 | B2 | * | 2/2010  | Takai ........................... 296/37.1 |
| 8,307,505 | B2 | * | 11/2012 | Harada ..................... B60R 7/06 16/293 |
| 8,505,994 | B2 | * | 8/2013  | Park et al. ................... 296/24.34 |

FOREIGN PATENT DOCUMENTS

JP    2007-223355 A    9/2007

* cited by examiner

*Primary Examiner* — Pinel Romain
(74) *Attorney, Agent, or Firm* — Kenyon & Kenyon LLP (57) ABSTRACT

A temporal engaging portion is provided at a bin. Therefore, by engaging a bin-side arm with a bin-side engaging portion and temporally engaging a panel-side arm with the temporal engaging portion after elastically deforming the panel-side arm, a torsion spring can be set to the bin before the bin is coupled with a panel. The bin set with the torsion spring is inserted into a recess of the panel. During rotation of the bin toward a closed position, a temporal engagement of the panel-side arm with the temporal engaging portion is released, and upon being released, the panel-side arm is elastically sprung-back to be finally engaged with the panel-side engaging portion. As a result, by only coupling the bin set with the torsion spring with the panel, the bin and the torsion spring can be coupled with the panel so that coupling work is improved.

8 Claims, 7 Drawing Sheets

OVERHEAD CONSOLE AND A COUPLING METHOD THEREOF

CROSS-REFERENCE TO RELATED APPLICATIONS

This application claims priority to Japanese Patent Application No. 2013-226190 filed on Oct. 31, 2013, which is incorporated herein by reference in its entirety.

TECHNICAL FIELD

The present invention relates to an overhead console for a vehicle and a coupling method of the overhead console.

BACKGROUND

Japanese Patent Publication 2007-223355 discloses a conventional coupling method of an overhead console where after coupling a bin with a panel from a design surface side, a torsion spring is set to the panel and the bin from a side surface of the panel.

However, there is a problem with the coupling method of the conventional overhead console. More particularly, it is difficult to set the torsion spring to a space between the bin and the panel after coupling the bin with the panel. Therefore, it is desirable to improve the conventional coupling method of an overhead console.

RELATED ART DOCUMENT

Patent Document

[Document 1] Japanese Patent Publication No. 2007-223355

BRIEF SUMMARY

One object of the invention is to provide an overhead console and a coupling method of the overhead console improved in coupling work compared with a conventional coupling work.

The overhead console according to certain embodiments of the present invention for achieving the above object is as follows:

(1) An overhead console comprising:

(a) a panel including a bearing and a panel-side engaging portion;

(b) a bin including a rotatable shaft rotatably supported by the bearing and a bin-side engaging portion, the bin being rotatably coupled with the panel so as to be rotatable between an open position and a closed position; and (c) a torsion spring including a coil portion, a panel-side arm finally engaged with the panel-side engaging portion after coupling the bin with the panel and a bin-side arm regularly engaged with the bin-side engaging portion, the torsion spring biasing the bin in an opening direction relative to the panel after coupling the bin with the panel, wherein a temporal engaging portion is provided at the bin, the panel-side arm of the torsion spring being temporally engaged with the temporal engaging portion before coupling the bin with the panel, the panel-side arm of the torsion spring having been released from a temporal engagement with the temporal engaging portion after coupling the bin with the panel.

(2) An overhead console according to item (1) above, wherein the torsion spring is set to the bin in a state that the panel-side arm of the torsion spring is elastically deformed and is temporally engaged with the temporal engaging portion, the bin set with the torsion spring being rotatably supported by the panel, the panel-side arm being pushed by the panel-side engaging portion on a way of rotation of the bin to the closed position during coupling the bin with the panel whereby the temporal engagement of the panel-side arm with the temporal engaging portion is released, upon the temporal engagement being released the panel-side arm being elastically sprung-back toward a free state of the torsion spring whereby the panel-side arm is finally engaged with the panel-side engaging portion of the panel.

(3) An overhead console according to item (1) above, wherein the panel-side arm of the torsion spring is engaged with the temporal engaging portion in a state that the panel-side arm is elastically deformed in a winding direction and an axial direction of the coil portion from a free state of the torsion spring when the torsion spring is set to the bin.

(4) An overhead console according to item (1) above, wherein the temporal engaging portion of the bin includes a base against which the panel-side arm is pressed in a direction reverse to a winding direction of the coil portion and a protrusion protruding from the base, against which the panel-side arm is pressed in an axial direction of the coil portion, when the torsion spring is set to the bin.

(5) An overhead console according to item (4) above, wherein when the bin is rotated toward the closed position during coupling the bin with the panel and the panel-side arm of the torsion spring is brought into contact with the panel-side engaging portion of the panel and is pushed in a direction reverse to a rotation of the bin toward the closed position, the panel-side arm of the torsion spring is moved to float up from the base of the temporal engaging portion, and when the panel-side arm of the torsion spring floats up to a tip of the protrusion, the panel-side arm of the torsion spring is caused to move over the protrusion due to a component in an axial direction of the coil portion, of a spring-back force of the panel-side arm toward a free state of the torsion spring, to finally engage with the panel-side engaging portion of the panel.

(6) An overhead console according to item (1) above, wherein the panel-side engaging portion of the panel downwardly extends from an upper wall of a recess-defining wall into a space defined in a recess, and an inclined portion defined by a surface or an edge is formed at a lower end of the panel-side engaging portion, the inclined portion being inclined in a direction toward a central side of the recess in a width direction of the recess and toward a rear side of a vehicle when viewed upwardly from a lower side of the vehicle.

(7) An overhead console according to item (6) above, wherein when the bin is rotated toward the closed position during coupling the bin with the panel and the panel-side arm of the torsion spring is brought into contact with the pane-side engaging portion of the panel and is pushed in a direction reverse to a rotation of the bin toward the closed position, the inclined portion of the panel-side engaging portion pushes the panel-side arm toward the protrusion, and when the panel-side arm is moved over the protrusion of the temporal engaging portion of the bin, the inclined portion of the panel-side engaging portion pushes the panel-side arm toward side wall of the panel to thereby finally engage the panel-side arm with the panel-side engaging portion.

(8) A coupling method of an overhead console according to item (1) above for coupling the bin and the torsion spring with the panel comprising:

a first step for setting the torsion spring to the bin by elastically deforming the panel-side arm of the torsion spring and engaging the panel-side arm with the temporal engaging portion of the bin;

a second step for inserting a portion of the bin set with the torsion spring into a recess of the panel and rotatably coupling the bin with the panel during coupling the bin with the panel; and a third step for rotating the bin toward the closed position relative to the panel during coupling the bin with the panel, pushing the panel-side arm of the torsion spring by the panel-side engaging portion of the panel thereby releasing a temporal engagement of the panel-side arm with the temporal engaging portion of the bin, and causing the panel-side arm of the torsion spring to finally engage with the panel-side engaging portion of the panel automatically, using a spring-back of the panel-side arm to a free state of the torsion spring.

Technical Advantages

According to the overhead console according to items (1)-(7) above, since the temporal engaging portion is provided, it is possible to set the torsion spring to the bin by engaging the bin-side arm of the torsion spring with the bin-side engaging portion and temporally engaging the panel-side arm of the torsion spring with the temporal engaging portion before coupling the bin with the panel. Further, since the temporal engagement of the panel-side arm with the temporal engaging portion has been released when coupling the bin with the panel is finished, it is possible to automatically engage the panel-side arm with the panel-side engaging portion of the panel by coupling the bin with the panel. Therefore, by coupling the bin temporally set with the torsion spring with the panel, the torsion spring also can be coupled to the panel. Thus, the coupling work of the overhead console is improved compared with the conventional coupling work.

According to the overhead console according to item (3) above, the panel-side arm of the torsion spring is temporally set to the temporal engaging portion in a state that the panel-side arm has been elastically deformed in the winding direction of the coil portion from a free state of the torsion spring. Thus, compared with a case where the panel-side arm is temporally set to the temporal engaging portion in a state that the panel-side arm has not been elastically deformed in the winding direction of the coil portion, the panel-side arm is prevented from being disengaged from the temporal engaging portion to cause the torsion spring to drop from the bin. Further, the panel-side arm of the torsion spring is temporally engaged with the temporal engaging portion in a state that the panel-side arm has been elastically deformed in the axial direction of the coil portion from a free state of the torsion spring. Thus, when a force directed in the winding direction of the coil portion is added on the panel-side arm so that the panel-side arm is disengaged from the temporal engaging portion, the panel-side arm is automatically deformed toward a free state of the torsion spring due to a spring-back force and moves to a range outside the temporal engaging portion in the axial direction of the coil portion. As a result, the panel-side arm can be disengaged from the temporal engaging portion by adding a force directed in the winding direction of the coil portion onto the panel-side arm, and the panel-side arm disengaged from the temporal engaging portion is prevented from engaging with the temporal engaging portion again.

According to the coupling method of the overhead console according to item (8) above, since the method includes the first step, it is possible to set the torsion spring to the bin before the bin is coupled with the panel. Further, since the method includes the second and third steps, the panel-side arm can be disengaged from the temporal engagement with the temporal engaging portion and can be finally engaged with the panel-side engaging portion of the panel automatically, by fitting the rotatable shaft provided at the bin into the bearing formed at the panel and then rotating the bin relative to the panel toward the closed position. Therefore, by coupling the bin temporally engaged by the torsion spring with the panel, coupling the torsion spring with the panel also can be conducted. Thus, the coupling work of the overhead console is improved compared with the conventional coupling work.

BRIEF DESCRIPTION OF THE DRAWINGS

Referring to the drawings, which form a part of this disclosure.

(a) is a step when the bin set with the torsion spring is moved toward the panel and a rotational shaft is fitted to a bearing, (b) is a step when the bin is rotated from the state of above (a) toward a closed position and a panel-side arm of the torsion spring is brought into contact with a panel-side engaging portion of the panel, and (c) is a step when the bin is further rotated from the state of above (b) toward the closed position and the panel-side arm of the torsion spring is disengaged from a temporal engaging portion of the bin and is engaged with the panel-side engaging portion of the panel.

(a) is a step corresponding to step (a) of FIG. 5.

(b) is a step corresponding to step (b) of FIG. 5; and (c) is a step corresponding to step (c) of FIG. 5.

(a) is a step corresponding to step (a) of FIG. 5.

(b) is a step corresponding to step (b) of FIG. 5; and (c) is a step corresponding to step (c) of FIG. 5.

(a) is a step corresponding to step (a) of FIG. 5;
(b) is a step corresponding to step (b) of FIG. 5; and
(c) is a step corresponding to step (c) of FIG. 5.

DETAILED DESCRIPTION

An overhead console and a coupling method of parts of the overhead console (hereinafter, a coupling method of the overhead console) according to certain embodiments of the present invention will be explained with reference to drawings. In the drawings, "UP" shows an upward direction of a vehicle, and "OUT" shows an outward direction in a width direction of the vehicle.

Figure 5:
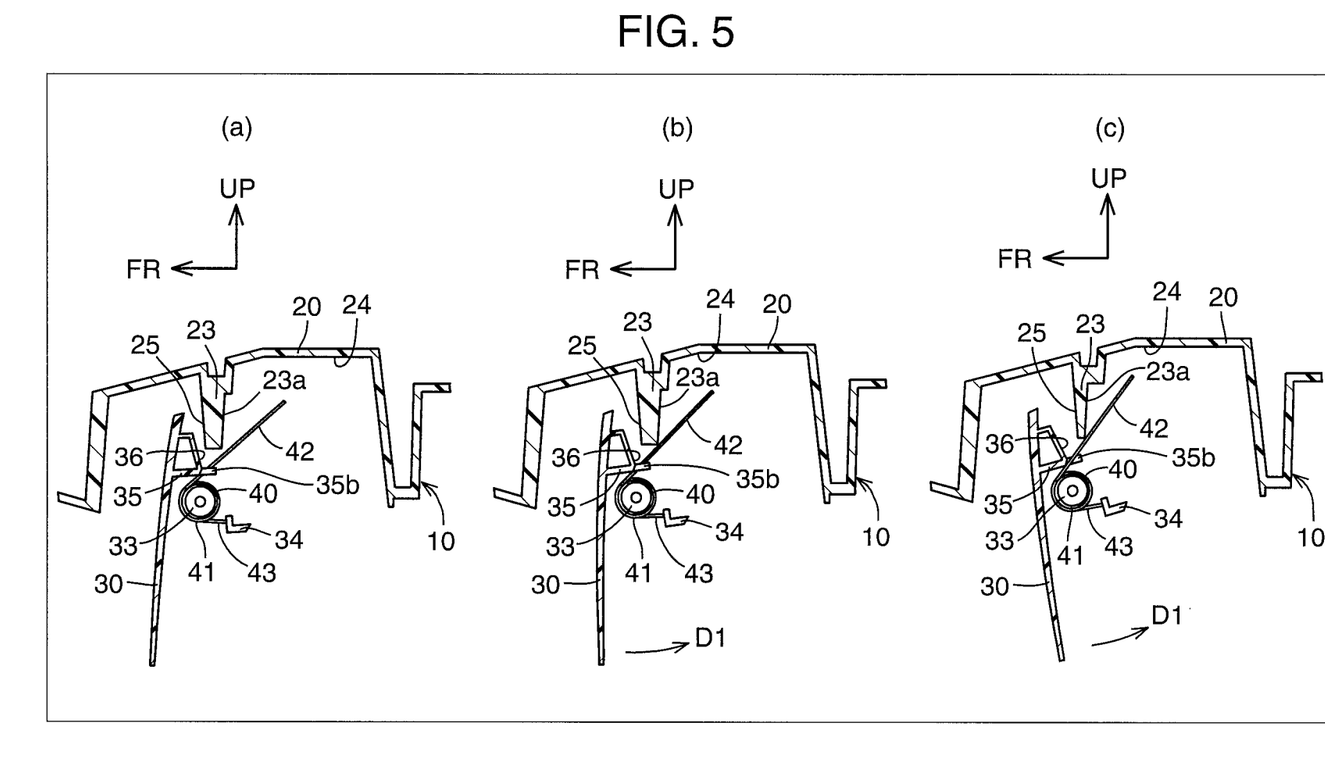
FIG. 5 is rough cross-sectional views of the overhead console at steps (a), (b) and (c) conducted in an order of (a), (b) and (c) when the bin set with the torsion spring is coupled with the panel, where.

The overhead console (hereinafter, "apparatus") 10 according to an embodiment of the present invention is provided at a ceiling of a passenger room of a vehicle. The apparatus 10 is located in a vicinity of a front end of the passenger room ceiling and at a central portion in a width direction of the vehicle. As illustrated in FIG. 5, the apparatus 10 includes a panel 20, a bin (which may be called a door or a lid) 30 and a torsion spring 40.

Figure 1:
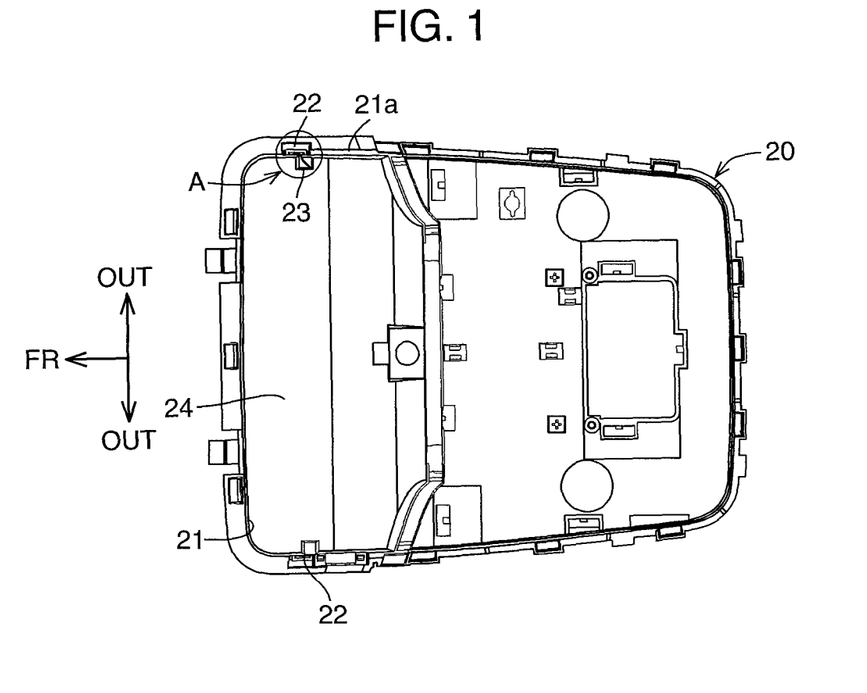
FIG. 1 is a bottom view of a panel among an overhead console according to an embodiment of the present invention.
Figure 2:
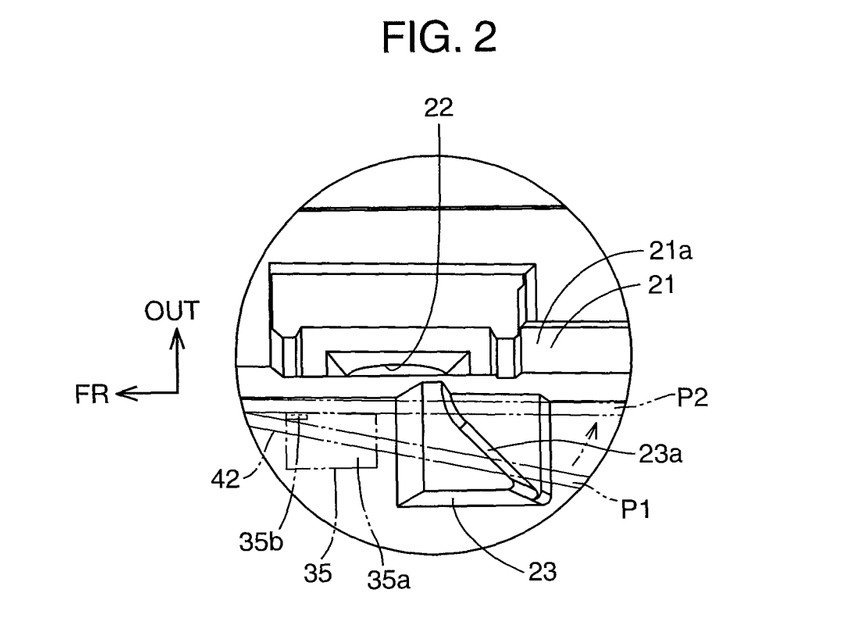
FIG. 2 is an enlarged view of portion "A" of FIG. 1.
Figure 3:
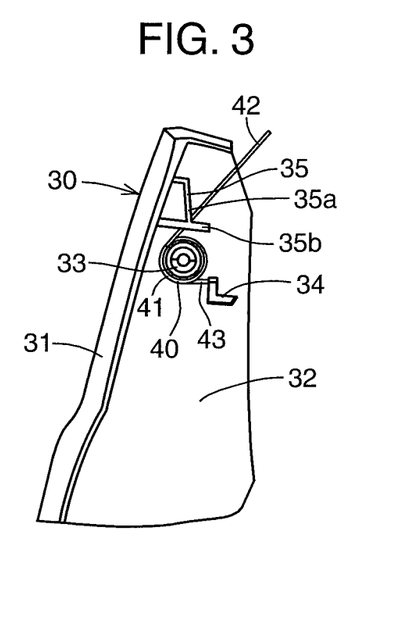
FIG. 3 is a side view of a bin and a torsion spring among the overhead console according to the embodiment of the present invention.

The panel 20 is made from, for example, synthetic resin. The panel 20 is fixed to the passenger room ceiling. As illustrated in FIGS. 1 and 2, the apparatus 10 includes a recess-defining wall 21, a bearing 22 and a panel-side engaging portion 23.

Figure 9:
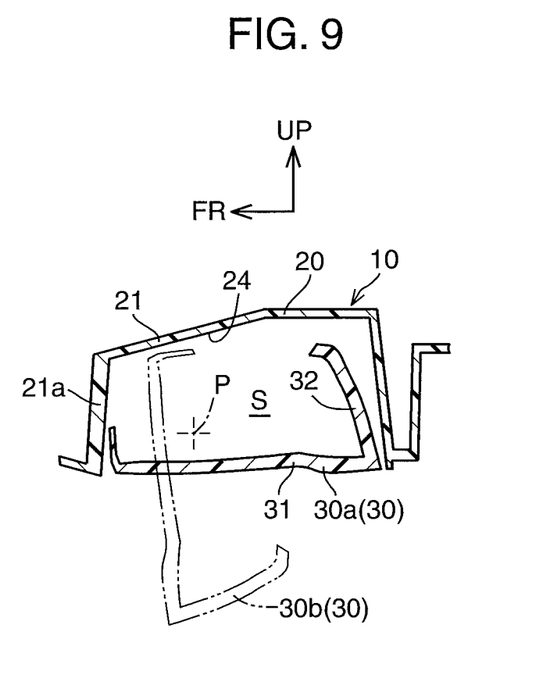
FIG. 9 is a rough cross-sectional view of the overhead console according to the embodiment of the present invention in a state that the bin and the spring are finally coupled with the panel.

As illustrated in FIG. 9, the recess-defining wall 21 defines a recess 24 opening downward. The recess-defining wall 21 includes a side wall 21a and an upper wall 21b. At least a portion of the bin 30 can enter the recess 24 and the torsion spring 40 always enters the recess 40.

As illustrated in FIG. 1, the bearing 22 is provided at the side wall 21a of the recess-defining wall 21. The bearing 22 is provided at a portion of each of the side walls 21a disposed on opposite sides of the apparatus 10 in a width direction of the apparatus 10 (i.e., the width direction of the vehicle) and extending in a front-rear direction of the vehicle.

The panel-side engaging portion 23 is integrally provided at the recess-defining wall 21. The panel-side engaging portion 23 is connected to at least one of the upper wall 21b and the side wall 21a. The panel-side engaging portion 23 may be provided at only one of the right and lift side walls 21a or may be provided at each of the right and lift side walls 21a. The panel-side engaging portion 23 protrudes into the recess 24 from the recess-defining wall 21. As illustrated in FIG. 2, the panel-side engaging portion 23 includes an inclined portion 23a at at least a rear surface of a bottom of the panel-side engaging portion 23. The inclined portion 23a is a surface or an edge line and is inclined toward a central side in the width direction of the apparatus (a central side in the width direction of the recess 24) and toward a rear side in the front-rear direction of the vehicle. In other words, the inclined portion 23a is inclined in a direction away from the side wall 21a to which the panel-side engaging portion 23 is connected and toward the rear side of the vehicle.

The bin 30 is made from, for example, synthetic resin. As illustrated in FIG. 9, The bin 30 is rotatably supported about a rotational axis P. The bin 30 is rotatable relative to the panel 20 between a closed position 30a closing an entirety (including a substantial entirety) of an opening of the recess 24 and an open position 30b located downward of the closed portion 30a in a rotational direction of the bin. The bin 30 includes a design panel 31 closing the opening of the recess 24 when the bin is at the closed position 30a and a rising wall 32 rising upward from a peripheral of the design portion 31 when the bin 30 is at the closed position 30a. The design panel 31 and the rising wall 32 define a space S therein capable of housing sunglasses, for example, etc.

When the bin 30 is located at the open position 30b, a stopper surface 36 of a temporal engaging portion 35 of the bin 30 contacts a stopper receiving surface 25 (see FIG. 5) provided at the panel engaging portion 23 of the panel 20 thereby preventing the bin 30 from opening too much.

Figure 4:
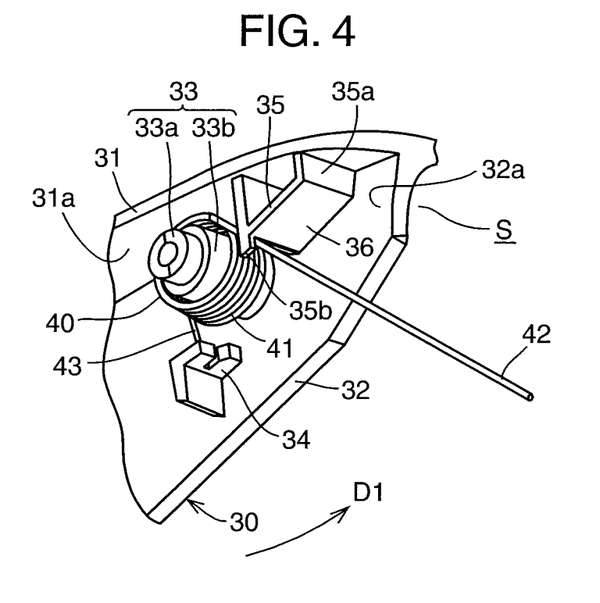
FIG. 4 is an enlarged perspective view of the torsion spring and the vicinity thereof of the overhead console according to the embodiment of the present invention, when the torsion spring is set to the bin before the bin is coupled with the panel.

As illustrated in FIG. 4, the bin 30 includes a rotatable shaft 33 and a bin-side engaging portion 34. The rotational axis P of the bin 30 of FIG. 9 coincides with a rotational axis of the rotatable shaft 33.

The rotatable shaft 33 is integrally formed with the rising wall 32. The rotatable shaft 33 is provided at the rising wall located at each of right and left sides of the apparatus 10 and extending in the front-rear direction of the vehicle. The rotatable shaft 33 protrudes in an outward direction in the width direction of the apparatus 10 from an outside surface of each of the right and left rising walls 32. A diameter of a tip portion 33a of the rotatable shaft 33 is smaller than a portion (a large diameter portion) 33b of the rotatable shaft 33 except the tip portion 33a. The tip portion 33a of the rotatable shaft 33 is fitted (inserted) into the bearing 22 from a side of the recess 24. The tip 33a of the rotatable shaft 33 is rotatably supported by the bearing 22. By the rotatable support, the bin 30 is supported by the panel 20 so as to be rotatable about the axis P. The bin-side engaging portion 34 is integrally provided with the rising wall 32 and protrudes from the outside surface of the rising wall 32 toward the side wall 21a of the recess-defining wall 21a of the panel 20.

The torsion spring 40 is made from metal. The torsion spring 40 biases the bin 30 in an open direction relative to the panel 20. As illustrated in FIGS. 4 and 5, the torsion spring 40 includes a coil portion 41, a panel-side arm 42 for being engaged with the panel-side engaging portion 23 and a bin-side arm 43 for being engaged with the bin-side engaging portion 34. The panel-side arm 42 is connected to one end of the coil portion 41 and the bin-side arm 43 is connected to the other end of the coil portion 41. As illustrated in FIG. 4, the coil portion 41 is fitted to an outside surface of the large diameter portion 33b of the rotatable shaft 33 of the bin 30. An axis of the coil portion 41 substantially coincides with an axis of the rotatable shaft 33 of the bin 30.

The temporal engaging portion 35 is provided at the bin 30.

The temporal engaging portion 35 is provided for temporally holding (temporally engaging) the torsion spring 40 with the bin 30 before the bin is coupled with the panel 20. The panel-side arm 42 is temporally engaged with the temporal engaging portion 35 before the bin 30 is coupled with the panel 20. The temporal engagement of the panel-side arm 42 with the temporal engaging portion 35 is released on a way of rotation of the bin 30 toward the closed position relative to the panel 20. The temporal engagement of the panel-side arm 42 with the temporal engaging portion 35 has been released when coupling of the bin 30 with the panel 20 is finished.

The temporal engaging portion 35 is provided at a portion of the bin 30 outside the housing space S. The temporal engaging portion 35 includes a base 35a and a protrusion 35b. The base 35a is provided at the design panel 31 so as to protrude upward from an upper surface (a back surface of a design surface) 31a when the bin 30 is at the closed position. The base 35a may be connected to an outside surface 32a of the rising wall 32. The protrusion 35b is provided at the base 35a so as to protrude upward from a portion of an upper end of the base 35a (i.e., an end further from the outside surface 32*a* of the rising portion 32, of the upper end of the base 35*a*), when the bin 30 is at the closed position.

When the torsion spring 40 is temporally engaged with the bin 30, the panel-side arm 42 of the torsion spring 40 is temporally engaged with the temporal engaging portion 35, and the panel-side arm 43 of the torsion spring 40 is engaged with bin-side engaging portion 34. The panel-side arm 42 is engaged with the temporal engaging portion 35 in a state that the panel-side arm 42 is elastically deformed from a free state of the torsion spring 40 in winding and axial directions of the coil portion 41 and in a direction where a contact pressure of the panel-side arm against the temporal engaging portion 35 is increased, while the bin-side arm 43 is engaged with the bin-side engaging portion 34. When the panel-side arm 42 is engaged with the temporal engaging portion 35, the panel-side arm 42 is engaged with the base 35*a* of the temporal engaging portion 35 in an unwinding direction of the coil portion and is engaged with the protrusion 35*b* in the axial direction of the coil portion. Since the panel-side arm 42 is engaged with the base 35*a*, the panel-side arm 42 engaged with temporal portion 35 can maintain the state deformed in the winding direction of the coil portion 41 from the free state of the torsion spring 40. Further, since the panel-side arm 42 is engaged with the protrusion 35*b*, the panel-side arm 42 engaged with temporal portion 35 can maintain the state deformed in the axial direction of the coil portion 41 from the free state of the torsion spring 40.

A coupling method of the overhead console according to the embodiment of the present invention includes a method for coupling the bin 30 and the torsion spring 40 to the panel 20 will now be explained.

The coupling method of the overhead console according to the embodiment of the present invention includes the following first to third steps in an order of the first to third steps:

(i) In the first step, as illustrated in FIG. 4, the torsion spring 40 is set (temporally held) to the bin 30, by engaging the bin-side arm 43 of the torsion spring 40 with the bin-side engaging portion 34 of the bin 30 and temporally engaging the panel-side arm 42 of the torsion spring 40 with the temporal engaging portion 35 of the bin 30.

Figure 6:
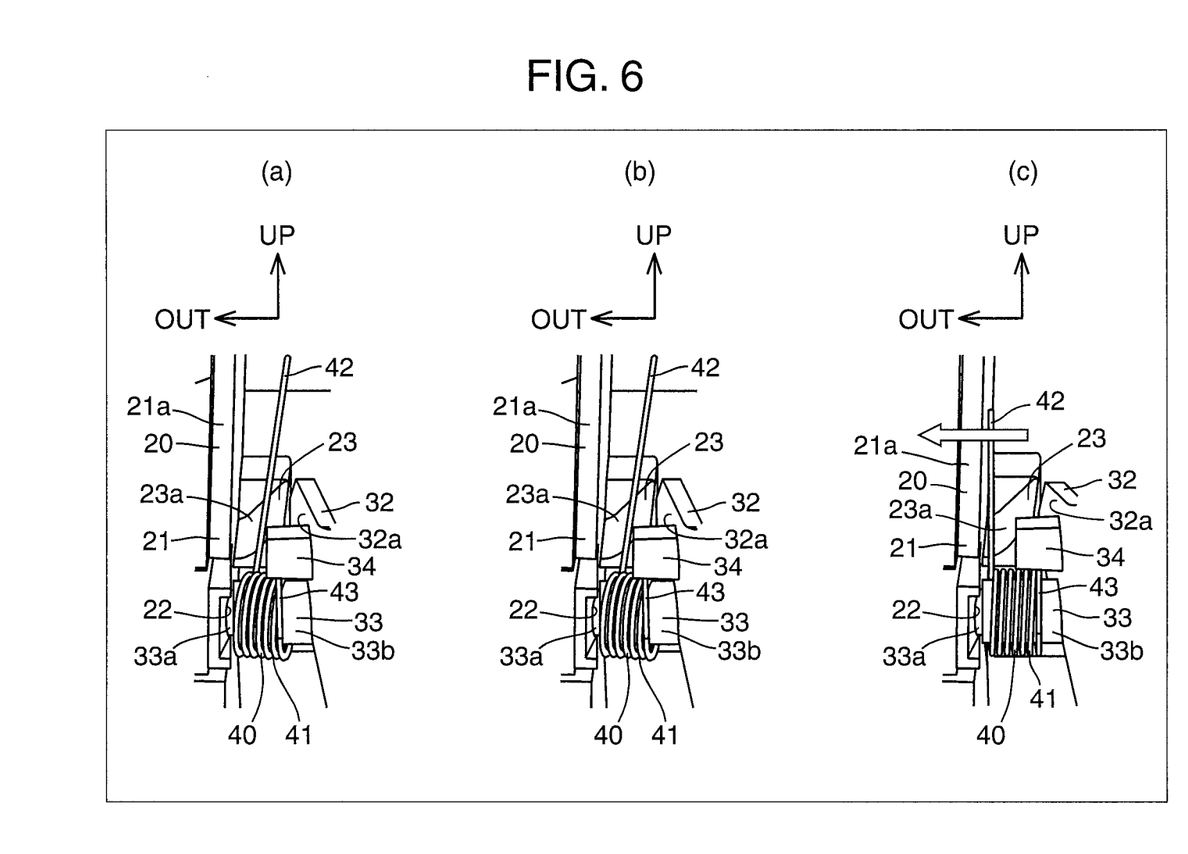
FIG. 6 is partial perspective views of the overhead console according to the embodiment of the present invention viewed from the bin-side arm of the torsion spring at steps (a), (b) and (c) when the bin set with the torsion spring is coupled with the panel, where.

(ii) In the second step, as illustrated in (a) of FIG. 5 and (a) of FIG. 6, the bin 30 set with the torsion spring 40 is inserted into the recess 24 at a state where the bin 30 is inclined relative to the panel 20 so as to be at the open position 30*b* or at a position on a way of rotation of the bin 30 from the open position 30*b* to the closed position 30*a*. Then, the rotatable shaft 33 is fitted into the bearing 22 whereby the bin 30 is rotatably supported by the panel 20.

Figure 7:
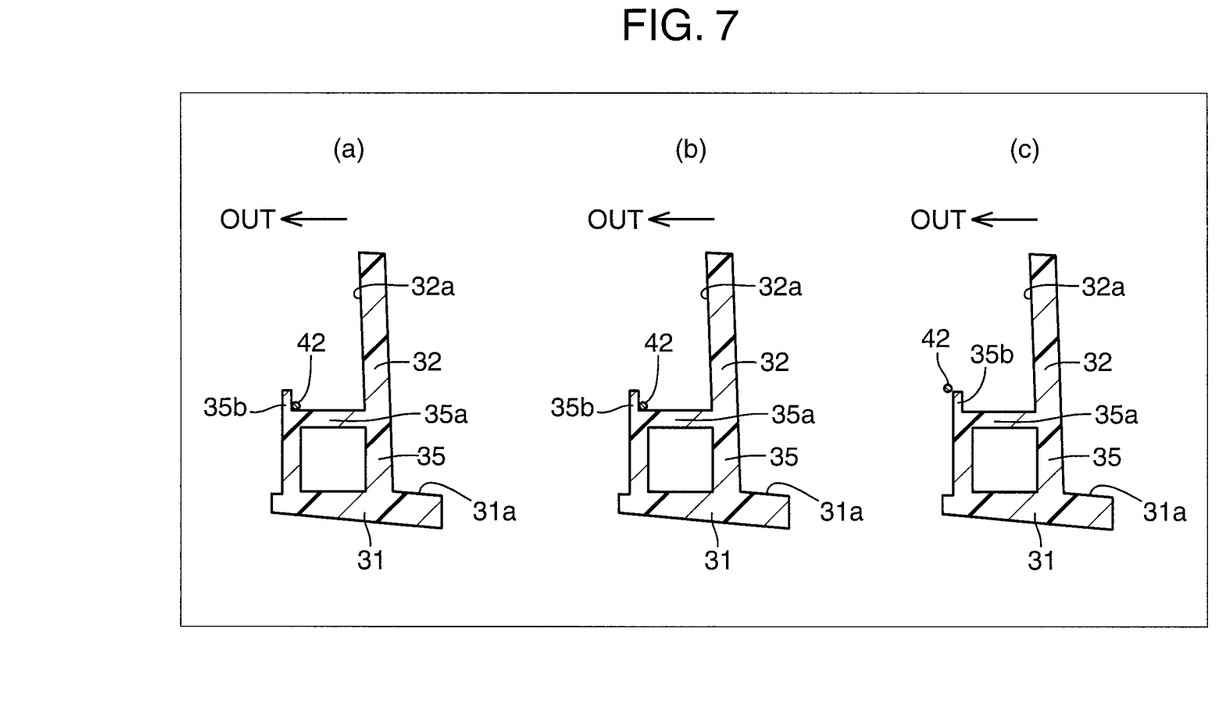
FIG. 7 is cross-sectional views of the panel-side arm of the torsion spring and the temporal engaging portion of the bin of the overhead console according to the embodiment of the present invention illustrating a positional relationship between the panel-side arm and the temporal engaging portion at steps (a), (b) and (c) when the bin set with the torsion spring is coupled with the panel, where.
Figure 8:
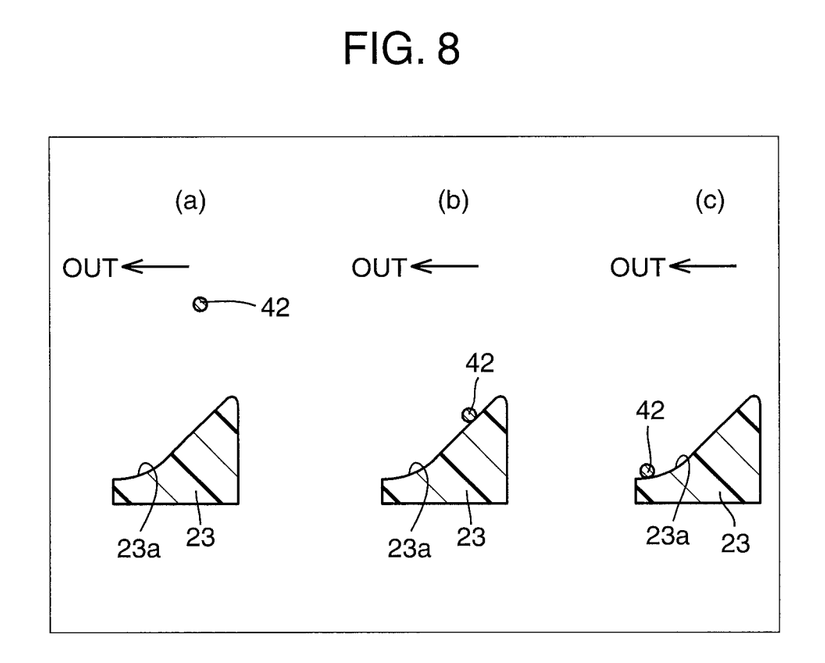
FIG. 8 is cross-sectional views of the panel-side arm of the torsion spring and the panel-side engaging portion of the panel of the overhead console according to the embodiment of the present invention illustrating a positional relationship between the panel-side arm and the panel-side engaging portion at steps (a), (b) and (c) when the bin set with the torsion spring is coupled with the panel, where.

(iii) In the third step, as illustrated in FIG. 2, (b) and (c) of FIG. 5, (b) and (c) of FIG. 6, (b) and (c) of FIG. 7, and (b) and (c) of FIG. 8, the bin 30 is rotated relative to the panel 20 from the above insertion position toward the closed position 30*a* (in direction D1 shown in (b) and (c) of FIG. 5). During rotation, the panel-side arm 42 begins to contact the panel-side engaging portion 23 of the panel 20 at position P1 shown in FIG. 2. When the bin 30 is further rotated from the contact-beginning position, the panel-side arm 42 is pushed by the panel-side engaging portion 23 in a direction reverse to rotation of the bin 30 toward the closed position thereby being released from the temporal engagement with the temporal engaging portion 35. More particularly, when the panel-side arm 42 is pushed by the panel-side engaging portion 23 in the direction reverse to rotation of the bin 30 toward the closed position, the panel-side arm 42 is caused to float up from the base 35*a* of the temporal engaging portion 35. When the panel-side arm 42 floats up to a tip of the protrusion 35*b*, the panel-side arm 42 is moved over the protrusion 35*b* due to an axial component of a spring-back force of the panel-side arm 42 to the free state of the torsion spring 40. Upon being released from the temporal engagement with the temporal engaging portion 35, the panel-side arm 42 slides on the inclined portion 23*a* of the panel-side engaging portion 23 due to the component of the spring-back force of the panel-side arm 42 to the free state of the torsion spring 40 and is moved to a front end of the inclined portion 23*a*. At the front end of the inclined portion 23*a*, the panel-side arm 42 contacts the side wall 21*a* of the recess-defining wall of the panel 20 to stop at position P2 shown in FIG. 2 and is finally engaged with the panel-side engaging portion 23.

The first step (the step of (i) above) is conducted before the bin 30 is coupled with the panel 20. As illustrated in FIG. 4, at the first step the coil portion 41 is fitted to the rotatable shaft 33 of the bin 30. At the first step, the panel-side arm 42 of the torsion spring 40 is engaged with the temporal engaging portion 35 in a state that the panel-side arm 42 is elastically deformed from a free state of the torsion spring 40 in winding and axial directions of the coil portion 41 and in a direction where a contact pressure of the panel-side arm against the temporal engaging portion 35 is increased.

At the second step (the step of (ii) above), as illustrated in (a) of FIG. 5, the bin 30 is caused to enter the recess 24 of the panel 20. At the second step, the rotatable shaft 33 is fitted to the bearing 22 under a state that the panel-side engaging portion 23 is located between the stopper surface 36 of the bin 30 and the panel-side arm 42.

At the third step (the step of (iii) above), the panel-side arm 42 is pushed by the panel-side engaging portion 23 in the winding direction of the coil portion 41. As illustrated in (b) and (c) of FIG. 8, at the third step, the panel-side arm 42 begins to contact the inclined portion 23*a* of the panel-side engaging portion 23 and then slides along the inclined portion 23*a*. As illustrated in (b) and (c) of FIG. 6, at the third step, when the panel-side arm 42 is moved relative to the bin 30 and is released from engagement with the temporal engaging portion 35, the panel-side arm 42 is elastically deformed in the axial direction of the coil portion 41 so as to automatically return to the free state of the torsion spring 40 thereby finally engaging the panel-side engaging portion 23. At the third step, when or before the bin 30 rotated toward the closed portion 30*a* reaches the closed position 30*a*, coupling of the bin 30 with the panel 20 is or has been completed.

Operation and technical advantages of the apparatus 10 according to the embodiment of the present invention will now be explained.

(A) According to the apparatus 10 according to the embodiment of the present invention, the following operation and technical advantages are obtained:

(A1) Since the temporal engaging portion 35 is provided at the bin 30, it is possible to temporally engage the torsion spring 40 with the bin 30 to thereby set the torsion spring 40 to the bin 30 before coupling the bin 30 with the panel 20, by engaging the bin-side arm 43 of the torsion spring 40 with the bin-side engaging portion 34 and temporally engaging the panel-side arm 42 of the torsion spring 40 with the temporal engaging portion 35. Further, since the temporal engagement of the panel-side arm 42 with the temporal engaging portion 35 is released on a way of coupling the bin 30 with the panel 20, the temporal engagement of the panel-side arm 42 with the temporal engaging portion 35 has been released when coupling the bin 30 with the panel 20 is completed, and the panel-side arm 42 is finally engaged with the panel-side engaging portion 23. Thus, it is possible to automatically engage the panel-side arm 42 with the panel-side engaging portion 23 of the panel 20 by coupling the bin 30 with the panel 20. Therefore, by only coupling the bin 30 temporally set with the torsion spring 40 with the panel 20, the torsion spring 40 also can be coupled to the panel 20. Thus, the coupling work of the overhead console 10 is improved compared with the conventional coupling work of the apparatus where the torsion spring was set to the apparatus after the bin was coupled with the panel.

(A2) Since the panel-side arm 42 of the torsion spring 40 is temporally engaged with the temporal engaging portion 35 in a state that the panel-side arm 42 has been elastically deformed in the winding direction of the coil portion 41 from a free state of the torsion spring 40. Thus, compared with a case where the panel-side arm 42 is temporally set to the temporal engaging portion 35 in a state that the panel-side arm 42 has not been elastically deformed in the winding direction of the coil portion 41, the panel-side arm 42 is prevented from being disengaged from the temporal engaging portion 35 to cause the torsion spring 40 to drop from the bin 30.

(A3) The panel-side arm 42 of the torsion spring 40 is temporally engaged with the temporal engaging portion 35 in a state that the panel-side arm 42 has been elastically deformed in the axial direction of the coil portion 41 from a free state of the torsion spring 40. Thus, when a force directed in the winding direction of the coil portion 41 is added on the panel-side arm 42 and the panel-side arm 42 is disengaged from the temporal engaging portion 35, the panel-side arm 42 is automatically deformed toward the free state of the torsion spring 40 in the axial direction of the coil portion 41 due to the spring-back force. As a result, the panel-side arm 42 can be disengaged from the temporal engaging portion 35 by only adding a force directed in the winding direction of the coil portion 41 onto the panel-side arm 42, and the panel-side arm 42 disengaged from the temporal engaging portion 35 is prevented from engaging with the temporal engaging portion 35 again.

(A4) When the bin 30 and the torsion spring 40 are coupled with the panel 20, the panel-side arm 42 is pressure-contacted onto the inclined portion 23a of the panel-side engaging portion 42. Thus, the panel-side arm 42 can be more surely prevented from being disengaged from panel-side engaging portion 23 than in a case where the panel-side arm 42 is not pressure-contacted onto the inclined portion 23a.

(A5) Since the stopper surface 36 for preventing the bin 30 from opening too much is provided at the temporal engaging portion 35, it simplifies the structure of the bin 30 and decreases material costs compared with a case where the stopper surface 36 is provided at a portion of the bin 30 except the temporal engaging portion 35. Further, since the stopper receiving surface 25 for preventing the bin 30 from opening too much is provided at the panel-side engaging portion 23, it simplifies the structure of the panel 20 and decreases material costs compared with a case where the stopper receiving surface 25 is provided at a portion of the panel 20 except the panel-side engaging portion 23.

(B) According to the coupling method of the apparatus 10 according to the embodiment of the present invention, the following operation and technical advantages are obtained:

(B1) Since the method includes the first step, it is possible to set the torsion spring 40 to the bin 30 before the bin 30 is coupled with the panel 20. Further, since the method includes the second and third steps, the panel-side arm 42 can be disengaged from the temporal engagement with the temporal engaging portion 35 and can be finally engaged with the panel-side engaging portion 23 of the panel 20 automatically, by fitting the rotatable shaft 33 provided at the bin 30 into the bearing 22 formed at the panel 20 and then rotating the bin 30 relative to the panel 20 toward the closed position 30a. Therefore, by coupling the bin 30 temporally engaged by the torsion spring 40 with the panel 20, coupling the torsion spring 40 with the panel 20 also can be conducted. Thus, the coupling work of the overhead console 10 is improved compared with the conventional coupling work.

(B2) At the third step, since the panel-side arm 42 contacts the inclined portion 23a of the panel-side engaging portion 23, the panel-side arm 42 once disengaged from the temporal engaging portion 35 is prevented from being engaged with the temporal engaging portion 35 again.

EXPLANATION OF REFERENCE NUMERALS 10 apparatus (overhead console)
20 panel
21 recess-defining wall
21a side wall
21b upper wall
22 bearing
23 panel-side engaging portion
23a inclined portion
24 recess
25 stopper receiving surface
30 bin
30a closed position
30b open position
31 design panel
32 rising wall
33 rotatable shaft
34 bin-side engaging portion
35 temporal engaging portion
35a base
35b protrusion
36 stopper surface
40 torsion spring
41 coil portion
42 panel-side arm
43 bin-side arm
P rotational axis of the bin
S space

What is claimed is:

1. An overhead console comprising:
   (a) a panel including a bearing and a panel-side engaging portion;
   (b) a bin including a rotatable shaft rotatably supported by the bearing and a bin-side engaging portion, the bin being rotatably coupled with the panel so as to be rotatable between an open position and a closed position; and
   (c) a torsion spring including a coil portion, a panel-side arm finally engaged with the panel-side engaging portion after coupling the bin with the panel and a bin-side arm regularly engaged with the bin-side engaging portion, the torsion spring biasing the bin in an opening direction relative to the panel after coupling the bin with the panel,
   wherein a temporal engaging portion is provided at the bin, the panel-side arm of the torsion spring being temporally engaged with the temporal engaging portion before coupling the bin with the panel, the panel-side arm of the torsion spring having been released from a temporal engagement with the temporal engaging portion after coupling the bin with the panel.

2. An overhead console according to claim 1, wherein the torsion spring is set to the bin in a state that the panel-side arm of the torsion spring is elastically deformed and is temporally engaged with the temporal engaging portion, the bin set with the torsion spring being rotatably supported by the panel, the panel-side arm being pushed by the panel-side engaging portion on a way of rotation of the bin to the closed position during coupling the bin with the panel whereby the temporal engagement of the panel-side arm with the temporal engaging portion is released, upon the temporal engagement being released the panel-side arm being elastically sprung-back toward a free state of the torsion spring whereby the panel-side arm is finally engaged with the panel-side engaging portion of the panel.

3. An overhead console according to claim 1, wherein the panel-side arm of the torsion spring is engaged with the temporal engaging portion in a state that the panel-side arm is elastically deformed in a winding direction and an axial direction of the coil portion from a free state of the torsion spring when the torsion spring is set to the bin.

4. An overhead console according to claim 1, wherein the temporal engaging portion of the bin includes a base against which the panel-side arm is pressed in a direction reverse to a winding direction of the coil portion and a protrusion protruding from the base, against which the panel-side arm is pressed in an axial direction of the coil portion, when the torsion spring is set to the bin.

5. An overhead console according to claim 4, wherein when the bin is rotated toward the closed position during coupling the bin with the panel and the panel-side arm of the torsion spring is brought into contact with the panel-side engaging portion of the panel and is pushed in a direction reverse to a rotation of the bin toward the closed position, the panel-side arm of the torsion spring is moved to float up from the base of the temporal engaging portion, and when the panel-side arm of the torsion spring floats up to a tip of the protrusion, the panel-side arm of the torsion spring is caused to move over the protrusion due to a component in an axial direction of the coil portion, of a spring-back force of the panel-side arm toward a free state of the torsion spring, to finally engage with the panel-side engaging portion of the panel.

6. An overhead console comprising:
(a) a panel including a bearing and a panel-side engaging portion;
(b) a bin including a rotatable shaft rotatably supported by the bearing and a bin-side engaging portion, the bin being rotatably coupled with the panel so as to be rotatable between an open position and a closed position; and
(c) a torsion spring including a coil portion, a panel-side arm finally engaged with the panel-side engaging portion after coupling the bin with the panel and a bin-side arm regularly engaged with the bin-side engaging portion, the torsion spring biasing the bin in an opening direction relative to the panel after coupling the bin with the panel, wherein a temporal engaging portion is provided at the bin, the panel-side arm of the torsion spring being temporally engaged with the temporal engaging portion before coupling the bin with the panel, the panel-side arm of the torsion spring having been released from a temporal engagement with the temporal engaging portion after coupling the bin with the panel, wherein the panel-side engaging portion of the panel downwardly extends from an upper wall of a recess-defining wall into a space defined in a recess, and an inclined portion defined by a surface or an edge is formed at a lower end of the panel-side engaging portion, the inclined portion being inclined in a direction toward a central side of the recess in a width direction of the recess and toward a rear side of a vehicle when viewed upwardly from a lower side of the vehicle.

7. An overhead console according to claim 6, wherein when the bin is rotated toward the closed position during coupling the bin with the panel and the panel-side arm of the torsion spring is brought into contact with the pane-side engaging portion of the panel and is pushed in a direction reverse to a rotation of the bin toward the closed position, the inclined portion of the panel-side engaging portion pushes the panel-side arm toward the protrusion, and when the panel-side arm is moved over the protrusion of the temporal engaging portion of the bin, the inclined portion of the panel-side engaging portion pushes the panel-side arm toward side wall of the panel to thereby finally engage the panel-side arm with the panel-side engaging portion.

8. The overhead console according to claim 1, wherein:
the torsion spring is set to the bin by elastically deforming the panel-side arm of the torsion spring and engaging the panel-side arm with the temporal engaging portion of the bin;
a portion of the bin set with the torsion spring is inserted into a recess of the panel and the bin is rotatably coupled with the panel during coupling the bin with the panel; and
the bin is rotated toward the closed position relative to the panel during coupling the bin with the panel, the panel-side arm of the torsion spring is pushed by the panel-side engaging portion of the panel thereby releasing a temporal engagement of the panel-side arm with the temporal engaging portion of the bin, and the panel-side arm of the torsion spring is engaged with the panel-side engaging portion of the panel automatically, using a spring-back of the panel-side arm to a free state of the torsion spring.

* * * * *